(12) United States Patent
Sihler et al.

(10) Patent No.: US 7,173,399 B2
(45) Date of Patent: Feb. 6, 2007

(54) INTEGRATED TORSIONAL MODE DAMPING SYSTEM AND METHOD

(75) Inventors: Christof Martin Sihler, Hallbergmoos (DE); Joseph Song, Hallbergmoos (DE)

(73) Assignee: General Electric Company, Niskayuna, NY (US)

( * ) Notice: Subject to any disclaimer, the term of this patent is extended or adjusted under 35 U.S.C. 154(b) by 136 days.

(21) Appl. No.: 11/110,547

(22) Filed: Apr. 19, 2005

(65) Prior Publication Data

US 2006/0232250 A1  Oct. 19, 2006

(51) Int. Cl.
*H02P 15/00* (2006.01)

(52) U.S. Cl. .................... 322/40; 322/37; 318/611; 318/434

(58) Field of Classification Search .......... 322/7, 322/10, 19, 37, 40, 99, 100; 318/434, 432, 318/611
See application file for complete search history.

(56) References Cited

U.S. PATENT DOCUMENTS

| | | | |
|---|---|---|---|
| 4,377,780 A | | 3/1983 | Bjorklund |
| 4,726,738 A | * | 2/1988 | Nakamura et al. ............ 417/22 |
| 4,736,143 A | * | 4/1988 | Nakamura et al. .......... 318/432 |
| 5,759,133 A | * | 6/1998 | Treinies et al. ............. 477/110 |
| 5,841,254 A | * | 11/1998 | Balch et al. ................ 318/430 |
| 5,880,550 A | * | 3/1999 | Fukao et al. ................ 310/179 |
| 6,072,297 A | * | 6/2000 | Xu et al. .................... 318/630 |
| 6,163,121 A | * | 12/2000 | Kumar et al. ............... 318/434 |
| 6,756,758 B2 | * | 6/2004 | Karikomi et al. ........... 318/434 |
| 6,838,854 B2 | * | 1/2005 | Inagaki et al. .............. 318/701 |
| 6,903,529 B2 | * | 6/2005 | Kunzel et al. .............. 318/611 |
| 2005/0017512 A1 | | 1/2005 | Kikuchi et al. |

FOREIGN PATENT DOCUMENTS

| | | |
|---|---|---|
| DE | 2748373 | 10/1977 |
| EP | 0239806 A | 10/1987 |
| JP | 06225457 A | 8/1994 |
| JP | 2001333533 A | 11/2001 |
| WO | 112234 | 12/2004 |

OTHER PUBLICATIONS

C. Sihler, "Suppression of Torsional Vibrations in Rotor Shaft Systems by a Thyristor Controlled Device", 2004 IEEE, pp. 1424-1430.

J. Joswig, et al., "Perceptions About New Kinds of Subsynchronous Resonances", University of Dortmund, Institute for Electrical Machines, Drives and Power Electronics, D-44227, Germany, 6 Pages.

(Continued)

*Primary Examiner*—Nicholas Ponomarenko
(74) *Attorney, Agent, or Firm*—Ann M. Agosti; Patrick K. Patnode (57) ABSTRACT

An integrated torsional mode damping method for a current source converter, including a rectifier, an inverter, and a DC link inductor coupled between the rectifier and the inverter, includes sensing a signal representative of torque on a shaft coupled to the inverter or rectifier; using the sensed signal for detecting a presence of a torsional vibration on the shaft; and damping the torsional vibration by modulating active power through the respective inverter or rectifier.

38 Claims, 9 Drawing Sheets

OTHER PUBLICATIONS

C. Wu, et al., Application of Simultaneous Active and Reactive Power Modulation of Superconducting Magnetic Energy Storage Unit to Damp Turbine-Generator Subsynchronous Oscillations, IEEE Trans. on Energy Conversion, vol. 8, No. 1, Mar. 1993, pp. 63-70.

"First Supplement to a Bibliography for the Study of Subsynchronous Resonance Between Rotating Machines and Power Systems", *IEEE Transactions on Power Apparatus and Systems*, vol. PAS-98, No. 6, Nov./Dec. 1979, pp. 1872-1875.
International Search Report dated Jul. 25, 2006.

* cited by examiner

INTEGRATED TORSIONAL MODE DAMPING SYSTEM AND METHOD

BACKGROUND

The invention relates generally to damping torsional vibrations.

Shaft assemblies in strings of prime movers and loads, comprising turbine generators, electrical motors or compressors, sometimes exhibit weakly damped mechanical resonances (torsional modes) with frequencies which can also fall below the network synchronous frequency. Mechanical damage can occur over time if an electric network exchanges significant energy with a generator at one or more of the natural frequencies of the shaft systems. Conventional countermeasures for torsional resonance phenomena include efforts to eliminate the source of resonance excitation by, for example, changing the network, operational, or control parameters.

When a power system has a connection to a large utility network with many gigawatts of generated power, electrical loads on the power system have only a negligible effect. In contrast, island power systems have no connection to a large utility network and island-like power systems have only a weak connection to a utility network (such as by means of a long transmission line with a comparably high impedance). Island and island-like power systems are commonly used in the marine industry (for example, onboard power systems of large ships), isolated on-shore installations (for example, wind turbine systems), and the oil and gas industry. In such power systems, the loads are typically large relative to the network (such that the loads can potentially affect the network). With increasing ratings of electrical motors and drives in these systems, the mechanical and electrical dynamics are increasingly coupled, thus making it difficult to avoid torsional oscillations in motor or generator drive trains by conventional countermeasure techniques.

One method for suppressing torsional vibrations in synchronous generators is described in C. Sihler, "Suppression of torsional vibrations in rotor shaft systems by a thyristor controlled device," 35$^{th}$ *Annual IEEE Power Electronics Specialist Conference*, pages 1424–1430 (2004). The method includes applying a torque in counter phase to a measured torsional velocity by means of an additional thyristor converter circuit comprising a six-pulse bridge circuit. This method is most applicable to embodiments wherein the installation of a separate line commutated converter system is technically and economically feasible.

BRIEF DESCRIPTION

Large electrical drives systems most commonly include load commutated inverters (LCIs). In a specific example of an oil platform, multiple gas turbine generators typically feed multiple motor loads (driven by LCIs) as well as devices such as power drills and pumps. It would be desirable to increase the reliability and robustness of the power system without the need of installing an additional thyristor converter system for damping torsional vibrations. In offshore and on-board power systems, the available space is very limited and the installation of a separate high-voltage circuit breaker, transformer, converter module, and energy storage element for active damping is not always feasible.

Although LCIs are generally based on thyristors which must be line-commutated, they are still the preferred technology for large drives with high nominal power, especially when high reliability is required. In a specific example of the oil and gas industry, an LCI with a nominal power of 54 mega volt-amperes is used to operate a 48 megawatt compressor drive train. The electrical motor is a synchronous machine operated at variable speed. The air-gap torque contains LCI harmonics and inter-harmonics that can cause torsional vibrations in the compressor drive train. The machine has two three-phase stator windings phase shifted by thirty degrees against each other in order to reduce the total air-gap torque ripple. Installing two separate thyristor converters in the two motor three-phase systems would present significant economical and technical challenges. The synchronous machine provides voltage-controlled three-phase systems that are directly connected to large thyristor bridges such that the voltage in these three-phase systems is highly distorted when operated at nominal power. These three-phase systems are not suited for connecting additional line-commutated converter systems. Torsional mode damping based on existing LCI drive systems would be desirable for such applications.

Briefly, in accordance with one embodiment of the present invention, an integrated torsional mode damping system is provided for modulating current in a DC link of a load commutated inverter system comprising a grid rectifier and a load inverter. The system comprises a sensor configured for sensing a signal representative of torque on a load side shaft, and an inverter controller configured for using the sensed signal for detecting a presence of a torsional vibration on the load side shaft and generating inverter control signals for damping the torsional vibration by modulating active power through the load inverter.

In accordance with a related method embodiment of the present invention, the method comprises sensing a signal representative of torque on the load side shaft, using the sensed signal for detecting a presence of a torsional vibration on the load side shaft, and damping the torsional vibration by modulating active power through the load inverter.

In accordance with another embodiment of the present invention, an integrated torsional mode damping system is provided for a current source converter comprising a rectifier, an inverter, and a DC link inductor coupled between the rectifier and the inverter. The system comprises a sensor configured for sensing a signal representative of torque on a shaft coupled to the inverter or rectifier and a controller configured for using the sensed signal for detecting a presence of a torsional vibration on the shaft corresponding to a natural frequency of the shaft and for generating control signals for damping the torsional vibration by modulating active power through the respective inverter or rectifier.

In accordance with a related method embodiment of the present invention, the method comprises sensing a signal representative of torque on a shaft coupled to the inverter or the rectifier, using the sensed signal for detecting a presence of a torsional vibration on the shaft corresponding to a natural frequency of the shaft, and damping the torsional vibration by modulating active power through the respective inverter or rectifier.

In accordance with another embodiment of the present invention, an integrated torsional mode damping system is provided for modulating current in a DC link of a load commutated inverter system comprising a grid rectifier and a load inverter. The system comprises a sensor configured for sensing a signal representative of torque on a grid side shaft, and a rectifier controller configured for using the sensed signal for detecting a presence of a torsional vibration on the grid side shaft and generating inverter control signals for damping the torsional vibration by modulating active power through the grid rectifier.

In accordance with a related method embodiment of the present invention, the method comprises sensing a signal representative of torque on a grid side shaft, using the sensed signal for detecting a presence of a torsional vibration on the grid side shaft, and damping the torsional vibration by modulating active power through the grid rectifier

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
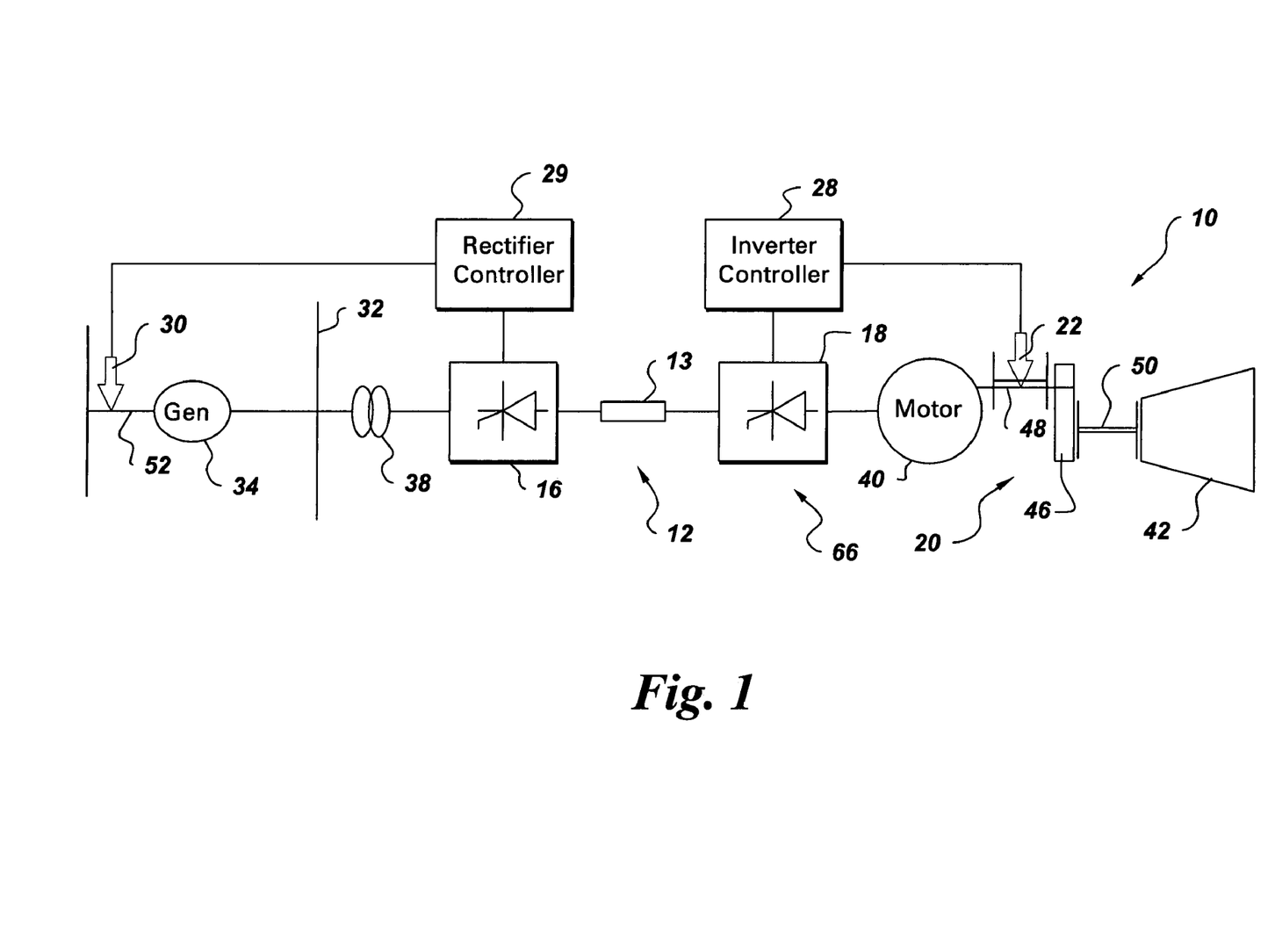
FIG. 1 is a block diagram of a system for damping torsional vibrations in accordance with one embodiment of the present invention.

FIG. 1 is a block diagram of a system 10 for damping torsional vibrations in accordance with one embodiment of the present invention. Although the examples described with respect to FIGS. 2–8 primarily relate to a grid and load embodiment with a load commutated inverter system, the principles are applicable in any current source converter 66 embodiment comprising a rectifier 16, an inverter 18, and a DC link inductor 13 coupled between rectifier 16 and inverter 18. Typically rectifier 16 and inverter 18 comprise thyristor type converters.

These embodiments are applicable regardless of whether the shaft is sensed on the rectifier side (shown by shaft 52) or the inverter side (shown by shaft 20 generally and shaft portions 48 and 50 more specifically). In one embodiment, the damping method comprises using a (meaning at least one) sensor 22 or 30 for sensing a signal representative of torque on a shaft coupled to inverter 18 (typically on the load side) or rectifier 16 (typically on the grid side) with "or" in this context meaning either or both, using the sensed signal for detecting a presence of a torsional vibration on the shaft, and damping the torsional vibration by modulating active power through the respective inverter or rectifier. "Coupled" in the context of the shaft may include electrical coupling such as via a motor 40 or generator 34 or more indirect coupling such as via a compressor 42 coupled to a motor, for example. "Controller" or "control" as used herein is meant to encompass any appropriate analog, digital, or combinations of analog and digital circuitry or processing units used to accomplish the designated control function.

Controller 29 is used for rectifier modulation control when modulation is present on the grid side, and controller 28 is used for inverter modulation control when modulation is present on the load side. As discussed below, when modulation occurs on one side but not the other, damping the torsional vibration by modulating active power may occur while maintaining the other of the inverter or the rectifier at a substantially constant power, and typically the presence of the torsional vibration is detected when the sensed signal is indicative of a natural frequency of the shaft. Typically generator 34 is coupled to a grid or busbar (shown as grid 32) that is in turn coupled to rectifier 16 by a transformer 38.

In one example, grid rectifier 16 comprises a fixed frequency rectifier, load inverter 18 comprises a variable frequency inverter, and motor 40 comprises a variable speed three phase synchronous motor.

Figure 2:
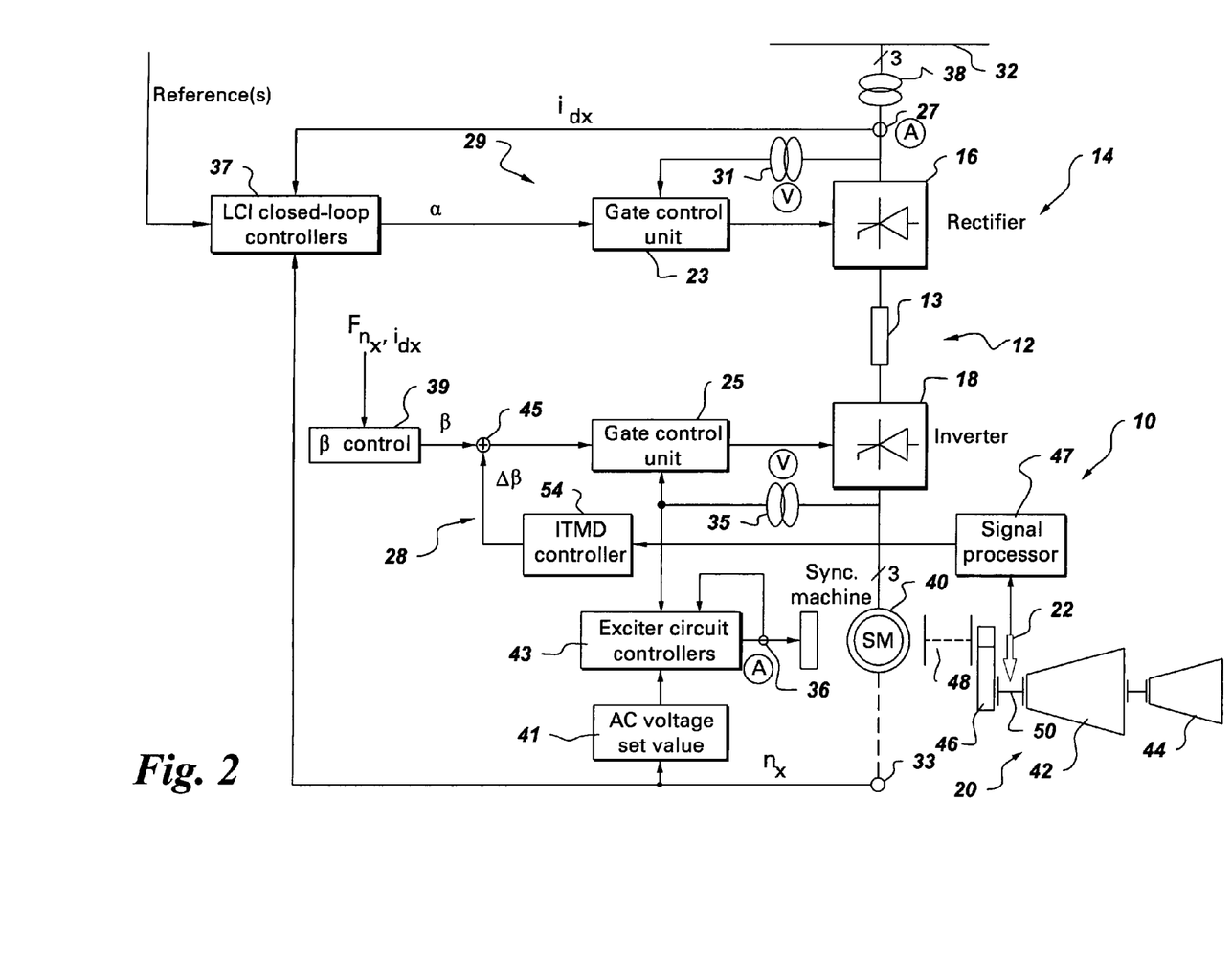
FIG. 2 is a block diagram of a damping system in accordance with another embodiment.

FIG. 2 illustrates an integrated torsional mode damping system 10 for modulating current in a DC link 12 of a load commutated inverter (LCI) system 14 comprising grid rectifier 16 and load inverter 18. System 10 is used to facilitate a method comprising sensing a signal representative of torque on a load side shaft 20, using the sensed signal for detecting a presence of a torsional vibration (meaning at least one torsional vibration) on load side shaft 20, and damping the torsional vibration by modulating active power through load inverter 18.

Although the terms generator, rectifier, inverter, and motor are used for purposes of illustration, these elements can be configured for working in either available mode. For example, motor 40 may, in some embodiments, operate as a generator with inverter 18 in turn operating as a rectifier and rectifier 14 acting as an inverter.

In one embodiment, the sensed signal that is representative of torque is obtained by a torque sensor 22, whereas other embodiments may use indirect sensors (such as speed sensors) which either are representative of torque or which can be used to determine torque. In the torque sensor embodiment, a torque sensor 22 is selected which is capable of measuring torsional vibrations in the intended assembly with sufficient accuracy. For example, for large diameter drive train embodiments, because of the high stiffness of the rigid shafts, the torsional angles along the shaft are often very small (hundredths to tenths of one degree) but the resulting torsional stress is high. The small torsional angle and high rotational speed of such shafts make it difficult to accurately measure torsional vibrations if conventional measurement devices such as speed sensors are applied. One contact-less sensor that provides inductive measurement of torque at different locations is available from the Fraunhofer Institute, for example. Alternatively, one example of a contact type torque sensor is a strain gauge sensor.

In one embodiment, the damping of the torsional vibration by modulating active power through load inverter 18 occurs while maintaining grid rectifier 16 at a substantially constant power. Substantially constant is defined as being less than plus or minus about two percent off of the nominal power and, in one embodiment, more specifically as being less than one-half of one percent off of the nominal power. In one aspect, maintaining grid rectifier 16 at the substantially constant power comprises sensing DC current and DC voltage on grid rectifier 16 and controlling the switching of the grid rectifier so as to maintain a constant product of the DC current and voltage. One technique for maintaining a constant product is discussed below with respect to the simulated graph of FIG. 8.

When grid rectifier 16 is maintained at a substantially constant power, then the magnetic energy stored in DC link 12 is the primary source for active damping and such damping does not affect the grid side of LCI 14. Alternatively, if grid rectifier 16 is controlled in the same way as load inverter 18, then the active power is supplied primarily from grid 32.

Figure 3:
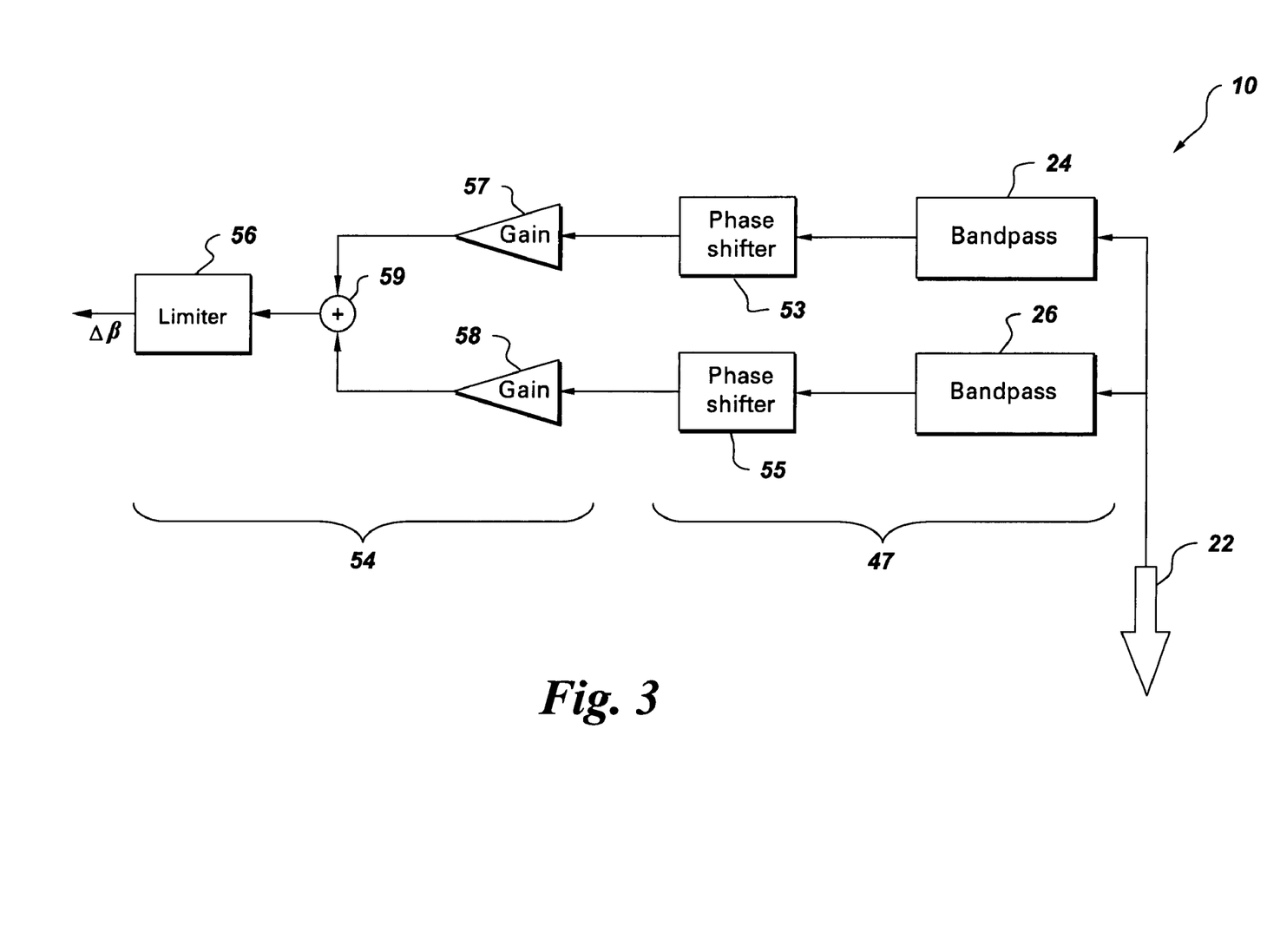
FIG. 3 is a block diagram of an integrated torsional mode damping control system embodiment.

Typically the presence of the torsional vibration is detected when the sensed signal is indicative of a natural frequency (meaning at least one natural frequency) of the load side shaft. More specifically, in one embodiment, damping comprises bandpass filtering of the sensed signal to detect the presence of the natural frequency. For purposes of example, FIG. 3 illustrates two bandpass filters 24 and 26 within signal processor 47 which are set to detect two natural frequencies. Alternatively, a single bandpass filter or additional bandpass filters may be used.

In one embodiment, the load comprises a motor 40 coupled to a compressor either directly or through a gearbox 46 (meaning at least one compressor and shown as two compressors 42 and 44 for purposes of example). Torque sensor 22 may be positioned at any location on a shaft of the load and is shown as being present on a portion 48 of the load side shaft between the motor and the gearbox for purposes of example in FIG. 1. Another or an additional position for the torque sensor is on a portion 50 of the load side shaft between the gearbox and the compressor as shown in FIG. 2, for example. Multiple sensor embodiments may be useful when different natural frequencies are present along the shafts at different locations and are difficult to detect by a common sensor. In the embodiment of FIG. 3, bandpass filter 24 is used to detect a frequency corresponding to the natural mode occurring in portion 48 (the first natural frequency of the load and the frequency of most concern), and bandpass filter 26 is used to detect a frequency corresponding to the natural mode occurring in portion 50 (the second natural frequency). Torque sensor 22, at either of the illustrated locations in FIG. 1 and FIG. 2, will get a signal (although weaker than a direct measurement embodiment wherein multiple torque sensors are used) relating to the other location.

Integrated torsional mode damping (ITMD) control system 10 determines which mode or modes are active and sets the phase shift accordingly with a 90° phase lag to the measured torsional vibration. In one embodiment, the modulation of the active power through load inverter 18 comprises modulating an inverter delay angle (shown as a beta angle ($\beta$)) of load inverter 18. Modulating the inverter delay angle $\beta$ results in modulating the inverter DC voltage which causes a modulation of the DC link current and results in an active power oscillation on the load input power. More specifically, modulating only the inverter delay angle in order to achieve torsional mode damping results in the damping power mainly coming from the magnetic energy stored in DC link 12. Such modulation is typically performed in such a way that the DC link need only act as a buffer storage of magnetic energy for the mechanical damping action. Modulation of the inverter delay angle results in rotational energy being transformed into magnetic energy (electromagnetic braking of the rotating shaft) and magnetic energy being transformed into rotational energy again (acceleration of the motor shaft system).

In one specific example, active damping of a torsional mode with a frequency of 19 Hz includes execution of braking and acceleration actions with cycle times of about 52 milliseconds which is no problem for a thyristor converter embodiment and can be shown by steady state simulations (which indicate that a modulation of the inverter delay angle by less than or equal to about three degrees is sufficient for an active damping of torsional oscillations in one application). If damping system 10 is designed to modulate the inverter delay angle by only small amounts, a design with a clearly defined interface to the main control system can be chosen which can easily be protected against malfunctions.

Figure 4:
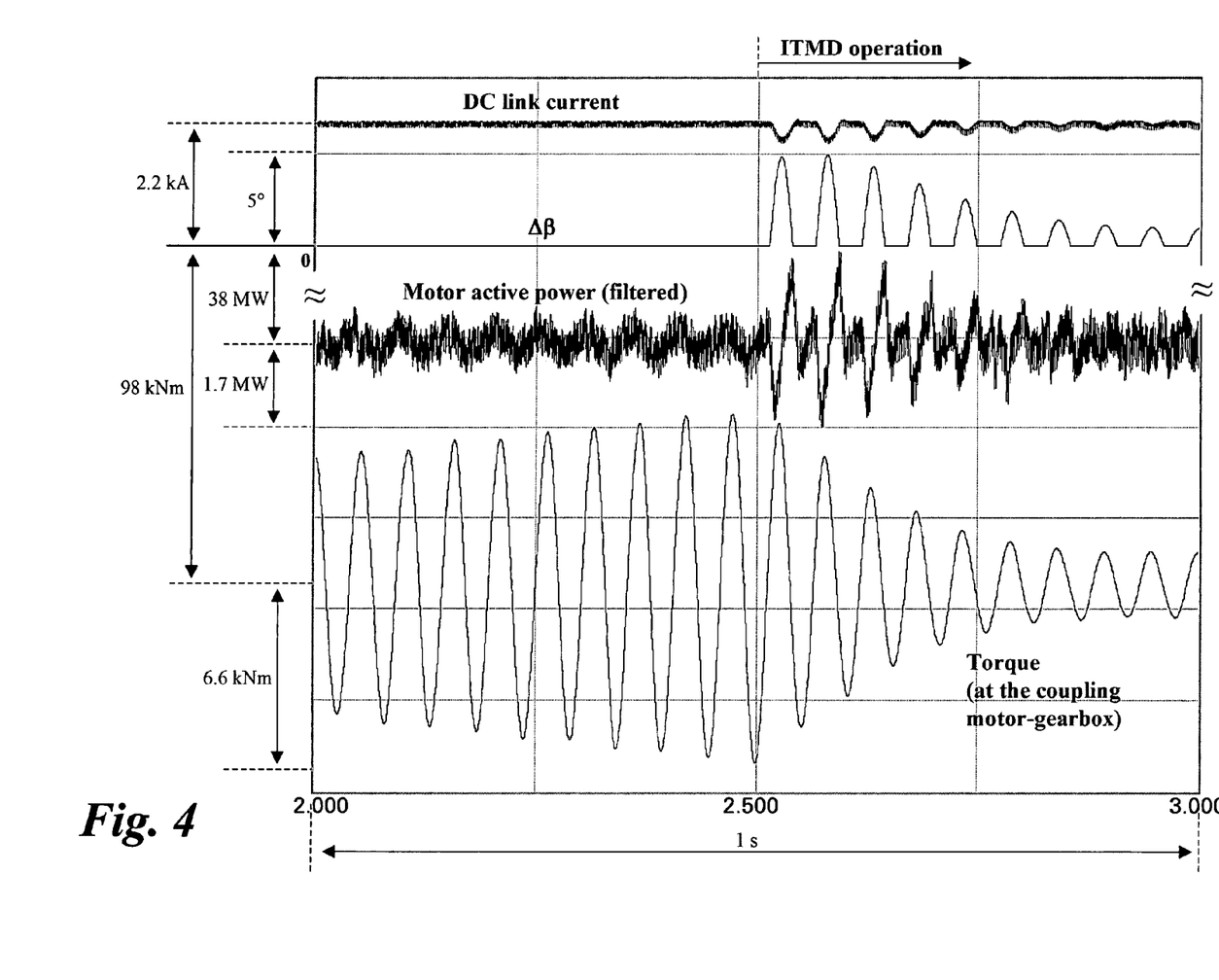
FIG. 4 is a graph illustrating simulated changes in DC link current, torque, and active power in response to an induced inverter delay angle in accordance with one aspect of the embodiment of FIGS. 2 and 3.

Typically a sine wave modulation is used. The frequency of the modulation corresponds to the natural frequency and the degree corresponds to the amplitude of the torsional oscillation as shown in FIG. 4. Bandpass filters 24 and 26 (FIG. 3) are used in order to derive signals from the torque measurement that represent the oscillating components of the torque. The number of filters is equal to the number of torsional modes to be actively damped. The signal at the output of the bandpass filter is a sine wave with one defined frequency corresponding to one major natural frequency of the shaft assembly. One phase shifter 53, 55 per bandpass filter is used to adjust the phase shift of each sine wave signal to the correct value. If desired, adjustable delay time modules can be used instead of phase shifters. For optimum damping, the sine wave signals are fed back with a phase shift of 90° (lagging). If a lagging phase angle of 90° cannot be achieved due to system time constants and phase lags in the feedback loop (which can sometimes be caused by the measurement or filtering), the phase shifter can be set to cause a total phase lag of 360°+90° between the torque (which is in phase with the torsion angle representing the torsional displacement) and the active power (or air-gap torque) caused by the ITMD controller. The total phase lag of the ITMD feedback circuit including all system time constants is typically determined experimentally in performing open-loop tests at low power level. Providing an adjustable gain (by amplifiers 57 and 58 of ITMD controller 54 for example) in each branch of the ITMD feedback loop enables adjustment of the active power involved with damping the different torsional modes (high gain results in high degree of modulation which in turn results in strong damping effect). Thus this feedback loop has the same effect as an increased natural damping of torsional modes with the degree of damping being electronically adjustable.

LCIs are designed to transfer active power from the supply grid to the motor (or vice versa) with an optimum power factor (typically about 0.9). Transferring power from the grid to the DC link with optimum power factor typically involves a delay angle alpha ($\alpha$) of grid rectifier 16 below about 25° (cos(25°)=0.91). At the same time the inverter delay ($\beta$) angle is typically greater than about 150° (cos (150°)=−0.87) so that approximately all the active power is transferred to the load (optimum efficiency). Inverters have a stability limit (inverting limit or beta limit) that is defined by a maximum value for the $\beta$ angle that is designed not be exceeded in order to prevent a shoot-through. Highest efficiency is achieved if the inverter is operated close to the inverter stability limit (for instance, given by a $\beta$ angle of about 153°). Modulation of the inverter $\beta$ angle while the inverter is operated close to its stability limit typically represents a challenge in applications with LCIs or inverters unless these systems are operated below maximum power or efficiency. In order to enable the application of an ITMD at nominal load without causing stability problems, the amplitude of the bidirectional modulation will typically be limited to the values specified by the drive system manufacturer. A bidirectional limitation (−n°<Δβ<n°) can simply be achieved by installing a limiter module 56 at the end of the ITMD feedback loop (after signal summation element 59), as shown in FIG. 3. In one embodiment the bidirectional modulation of the inverter β-angle is replaced by a unidirectional modulation. This can be achieved by means of the same limiter module 56 in setting the upper or the lower limit to zero (−n°<Δβ<0 or 0<ΔβP<n°). In the unidirectional embodiment, due to the limiting of Δβ either to one ("one" meaning herein either −n°<Δβ<0 or 0<ΔβP<n°, but not both) maximum allowed increase or decrease value (such as four degrees for example), only the positive or negative half-cycles of the sine waves pass through this module.

FIG. 2 additionally illustrates an LCI closed-loop controller 37 that receives reference signals, a motor speed signal from speed sensor 33, and a current signal from current sensor 27 and that generates a rectifier delay angle α which is used by rectifier gate controller 23 in combination with a voltage signal obtained from voltage sensor 31. The speed and current values are additionally used by inverter delay angle control 39 to establish a baseline β value which is then combined with the Δβ value at summation element 45 and used by inverter gate control unit 25. Gate control unit 25 additionally receives input signals from a voltage sensor 35. Exciter current controller 43 receives a current and a voltage signal from current sensor 36 and voltage sensor 35 and additionally an AC voltage set value signal from control element 41 that is based on motor speed. The ITMD control embodiment does not disturb (or adversely affect) the conventional LCI control system because the inverter delay angle is only modulated with a small amplitude (typically less than about 3°) and the β angle control function of this LCI is a forward control function.

LCI systems are typically operated at system design limits in order to transfer the nominal active power for driving the load with an optimum power factor. As discussed above, in one embodiment, a unidirectional modulation is applied in the nominal load case. In this unidirectional embodiment, modulating the delay angle comprises modulating the delay angle in the range of zero degrees through a delay angle maximum increase value (represented by the Δβ line in FIG. 4) or a delay angle maximum decrease value (represented by the Δβ line in FIG. 5) as compared with a bidirectional embodiment wherein modulation extends both above and below zero degrees.

FIG. 4 is a graph illustrating simulated changes in DC link current, torque, and active power in response to an induced inverter delay angle in accordance with one aspect of the embodiment of FIGS. 2 and 3 including a unidirectional increase in the β angle. The maximum increase value will depend upon the system design but is typically not expected to exceed about five degrees. In order to better demonstrate the damping effect of the ITMD, the β modulation starts to operate at time=2.5 s (for example, after the amplitude of the torsional oscillation exceeds a pre-defined value). The unidirectional modulation of the β angle causes a bidirectional modulation of the active power exchanged between the motor and the LCI DC link. This is a useful feature of the unidirectional β angle modulation because the result is that efficient active damping can be achieved without leaving the operating point of the drive system (exchanging active power in both directions), without exceeding the maximum allowed current in the DC link, and essentially without exchanging pulsed active power with the grid (which could violate grid codes or cause stability problems in island networks).

Figure 5:
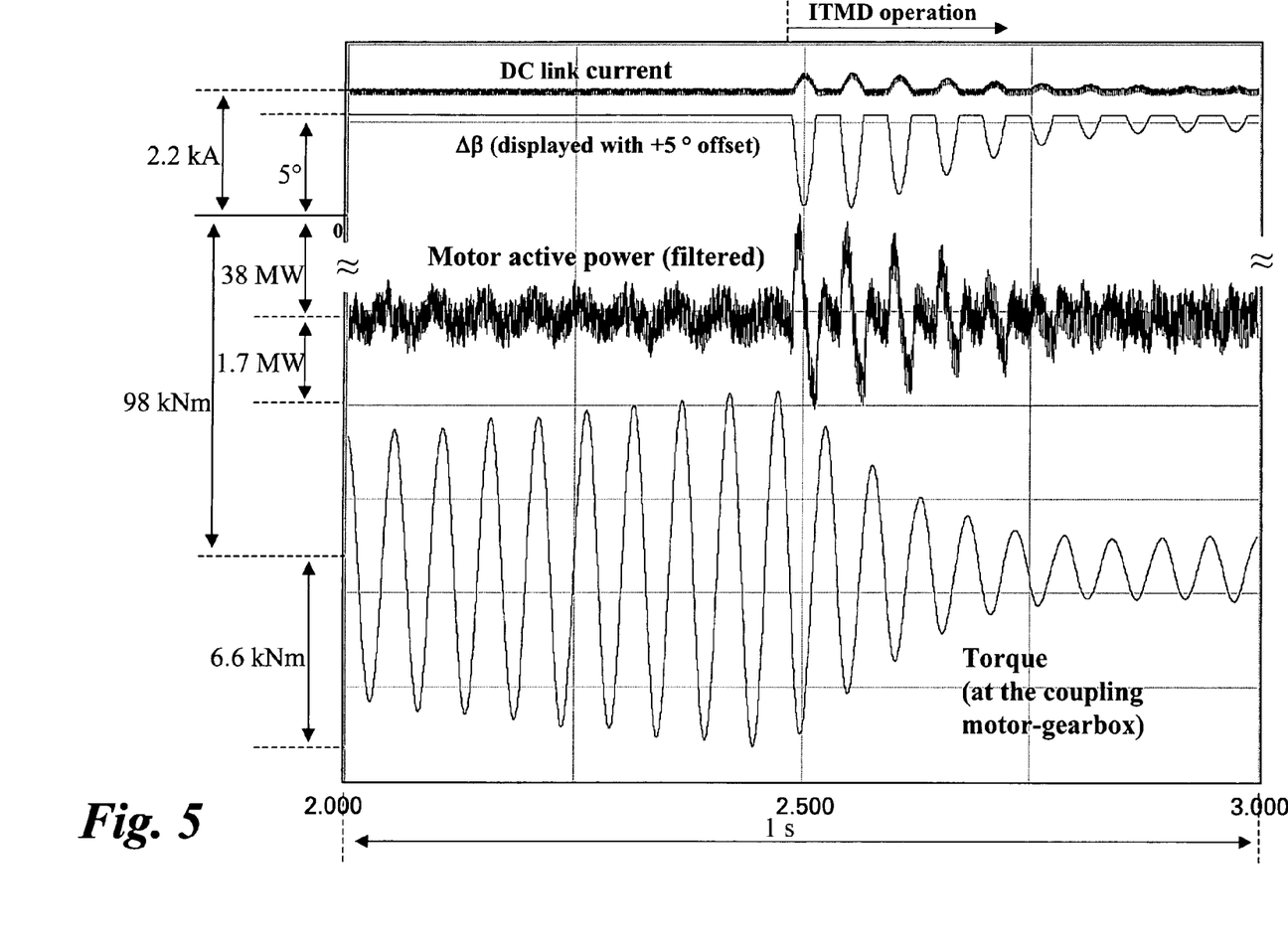
FIG. 5 is a graph illustrating simulated changes in DC link current, torque, and active power in response to an induced inverter delay angle in accordance with another aspect of the embodiment of FIGS. 2 and 3.

FIG. 5 is a graph illustrating simulated changes in DC link current, torque, and active power in response to an induced inverter delay angle in accordance with another aspect of the embodiment of FIGS. 2 and 3 including a unidirectional decrease in the β angle. At nominal load, LCI inverters are sometimes operated at an inverter delay angle β which is close to the inverter stability limit (β limit), so that a modulation with Δβ>0 as shown in FIG. 4 creates a risk of exceeding the β limit. Instead, a unidirectional β modulation where the inverter delay angle is modulated in the range of zero degrees through an inverter delay angle maximum decrease value (represented by the Δβ line in FIG. 5) can be applied. Such a unidirectional modulation would cause an acceptable short-time over-current if the inverter delay angle were modulated with a small amplitude (typically less than about 3°). The advantage of this unidirectional modulation method is that it can be applied in cases where the existing drive system is operated close to its stability limit (β limit) without having to adapt the control of the existing drive system. Generally, unidirectional delay angle modulations make it possible to integrate torsional mode dampers into existing drive systems without adapting their control system. The decision whether a unidirectional modulation, if used, shall be based on an increase or a decrease of the converter delay angle mainly depends on the design of the existing drive system and whether the modulation is applied to an inverter or rectifier.

Although unidirectional embodiments result in a less efficient damping than bidirectional embodiments, the unidirectional modulation method reduces potential instabilities of the converter system, commutation errors, and trip signals due to measured over-current. The damping efficiency of the unidirectional modulation method is considered to be sufficient for most damping applications because the excitation of torsional vibrations will be caused by harmonics with low amplitudes (often but not always less than about one percent of the nominal power).

Figure 6:
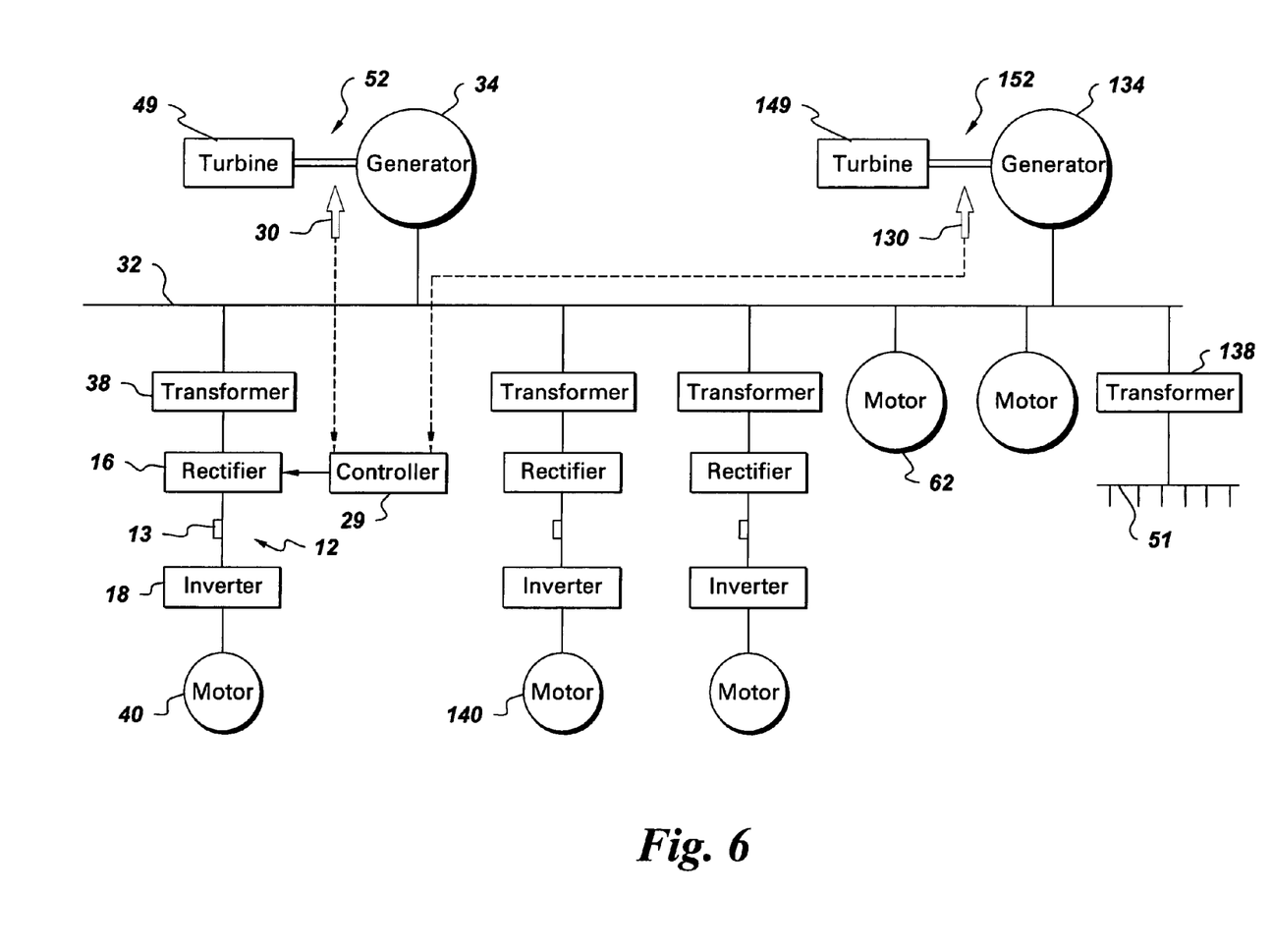
FIG. 6 is a block diagram of a damping system in accordance with another embodiment.
Figure 7:
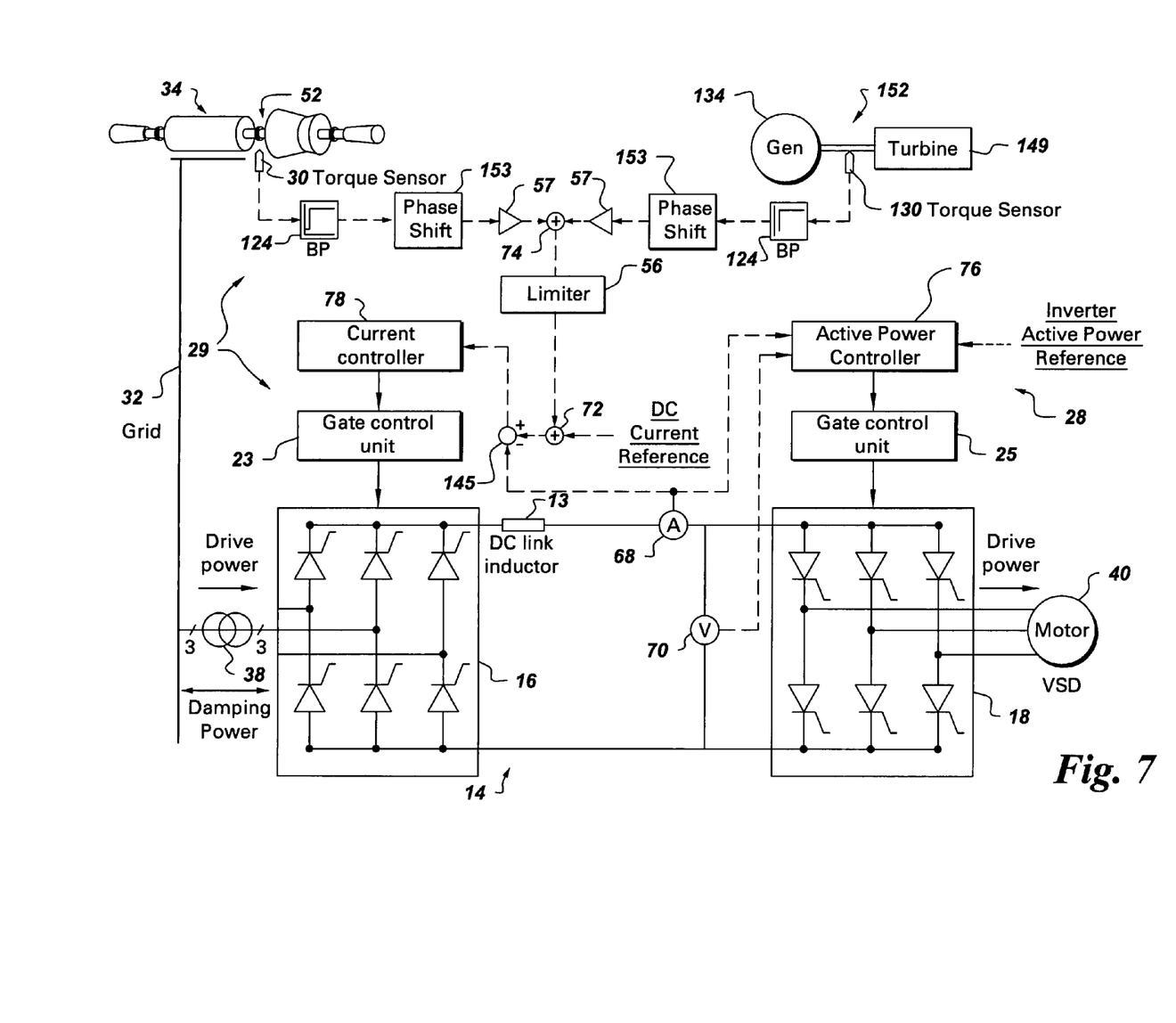
FIG. 7 is a closer view of several of the aspects of the embodiment of FIG. 6.
Figure 8:
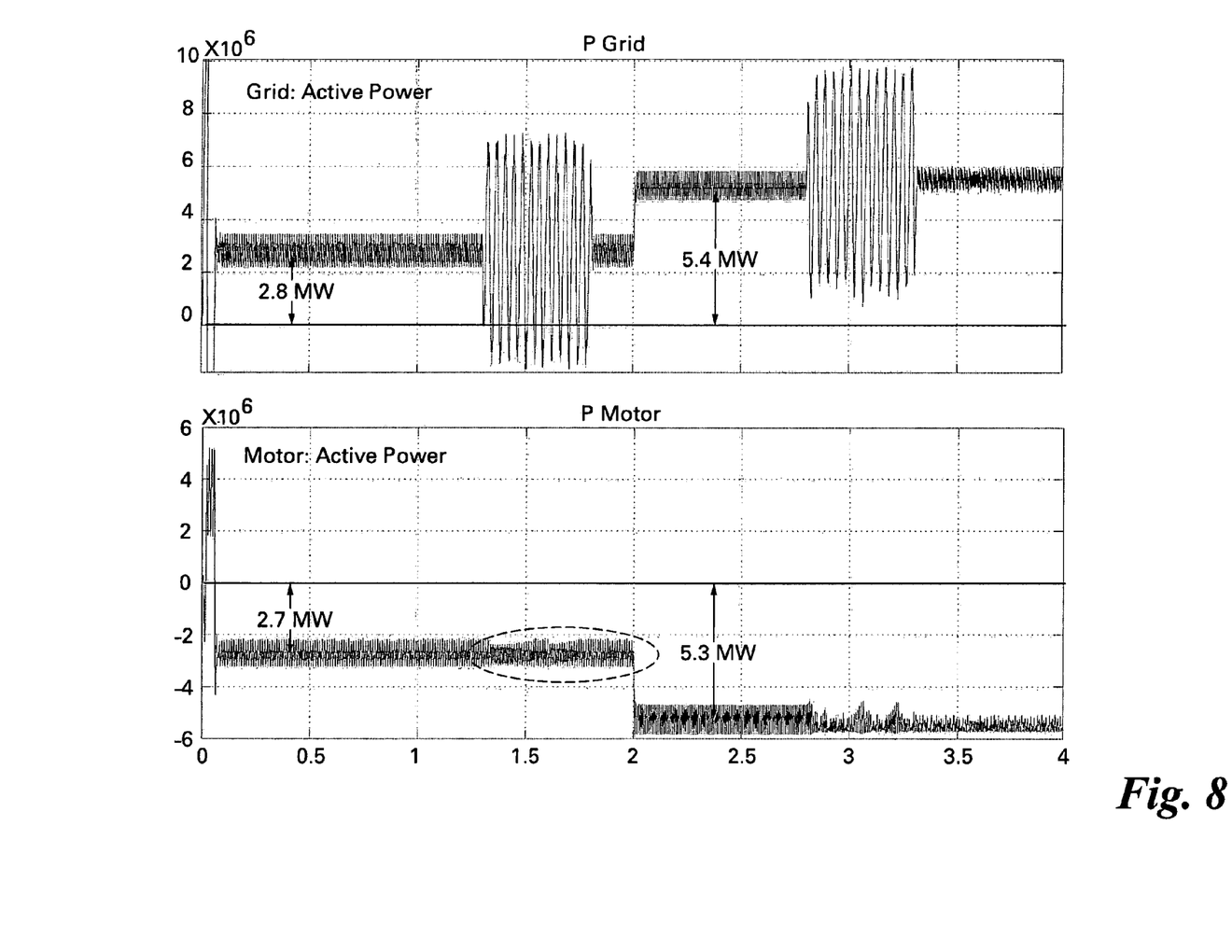
FIG. 8 is a graph illustrating simulated active power curves in the grid and in the motor as an expected result of use of the embodiment of FIG. 7.

FIG. 6 is a block diagram of a damping system in accordance with another embodiment wherein damping occurs on the grid side of the system, and FIG. 7 is a closer view of several of the aspects of the embodiment of FIG. 6. In a similar manner as discussed above with respect to FIGS. 2–5, except that measurements and adjustments are made on the grid side, a damping method comprises sensing a signal representative of torque on a grid side shaft 52, using the sensed signal for detecting a presence of a torsional vibration on the grid side shaft, and damping the torsional vibration by modulating active power through grid rectifier 16.

The current in DC link 12 is thus controlled by grid rectifier 16, which typically comprises a thyristor rectifier. The motor control is mainly performed by the inverter with the inverter delay angle determining the active power transferred to the motor and enabling closed loop control functions such as speed or torque control of the motor. For ease of illustration in FIG. 7, these closed loop control functions and other control functions, such as a power factor control based on an adaption of the DC link current reference depending on the actual motor power, are not shown. In modulating the current in the DC link inductor (by means of controlling the rectifier) an oscillating active power can be generated on the grid side. The exchange of active power between LCI circuit 14 and generator 34 effectively damps torsional vibrations measured by torque sensor 30. Typically the LCI circuit only exchanges small amounts of active power with the generator, so that the existing LCI circuit can be used for active damping without overloading the system.

When the rating of generator 34 considerably exceeds the rating of motor 40 or when extreme disturbances in the island network can occur (such as when the generator also supplies a large pulsed load (not shown in FIG. 7)), one of the LCIs in the power system can be designed for supplying higher power (such as about ten percent) than actually needed for driving the motor connected to the inverter. Thus, the additional ten percent of the nominal power of the LCI could be used for active damping or stabilizing torsional oscillations in generator shaft assemblies, even when the motor is operated at nominal load.

As discussed above, in order to reduce negative effects of a damping action on the rotor dynamics of the motor, the active power transferred to the motor can be kept at a constant value. FIG. 7 illustrates one control arrangement for maintaining constant power. In measuring the DC current (with current sensor 68) and DC voltage (with voltage sensor 70)) on the inverter side and applying a control law through active power controller 76 for the inverter directing that the product of these two measured signals remain substantially constant (which does not affect the ability to control the active power going to the motor), high modulations of active power can be achieved on the grid side without mechanically affecting the motor driven by this LCI. The capability of this control embodiment is demonstrated in the simulated graph of FIG. 8. While modulating the power exchanged between the LCI and the grid with an amplitude higher than 3 MW, the inverter exchanges a constant active power with the motor. At the same time the inverter active power reference can be changed, for example from 2.7 MW to 5.3 MW. Thus the control technique to keep the product constant does not appear likely to affect the capability of the inverter drive system.

FIGS. 6 and 7 also shows how signals representative of torque in multiple generator shaft assemblies (illustrated by generators 34 and 134, shafts 52 and 152, and turbines 49 and 149 for purposes of example) can be combined at summation element 74 (FIG. 7) of the ITMD control system so that one LCI circuit can provide active damping for torsional modes occurring in different turbine generators feeding the power system. Multiple sensors 30 and 130 on multiple turbine-generator shafts may be used by one or more rectifier controllers 29 to provide signals for creating the desired modulation. FIG. 7 additionally illustrates a summation element 72 for summing an output signal of limiter 56 with a DC current reference and a summation element 145 for subtracting the DC current signal from sensor 68 before sending the resulting signal to the current controller 78. Furthermore, in some embodiments, as shown in FIG. 6, additional LCI coupled motors 140 and/or direct-coupled motors 62 may be present. Directly coupled motors are useful for providing electricity for items such as cooling units, power drills, and pumps, for example. For purposes of example, FIG. 6 also illustrates a transformer 138 coupled between the generator bus and lower voltage bus 51.

The embodiments discussed above with respect to FIGS. 2–5 are additionally applicable to the embodiments of FIGS. 6 and 7 and vice versa. For example, bandpass filter 124 and phase shifter 153 may be configured to perform similar functions as described above with respect to bandpass filter 24 and phase shifter 53 of FIG. 3. As another example, in one embodiment, an inverter controller 28 is configured for damping torsional vibrations on a motor by modulating active power through inverter 18, and rectifier 16 is provided with control signals by rectifier controller 29 (based on the product of the measured DC link current and rectifier DC voltage) for maintaining the input active power at a substantially constant level. Alternatively, modulating the rectifier delay angle as shown in FIGS. 6 and 7 can optionally comprise modulating in a range of zero degrees through a rectifier delay angle maximum increase or decrease value.

Figure 9:
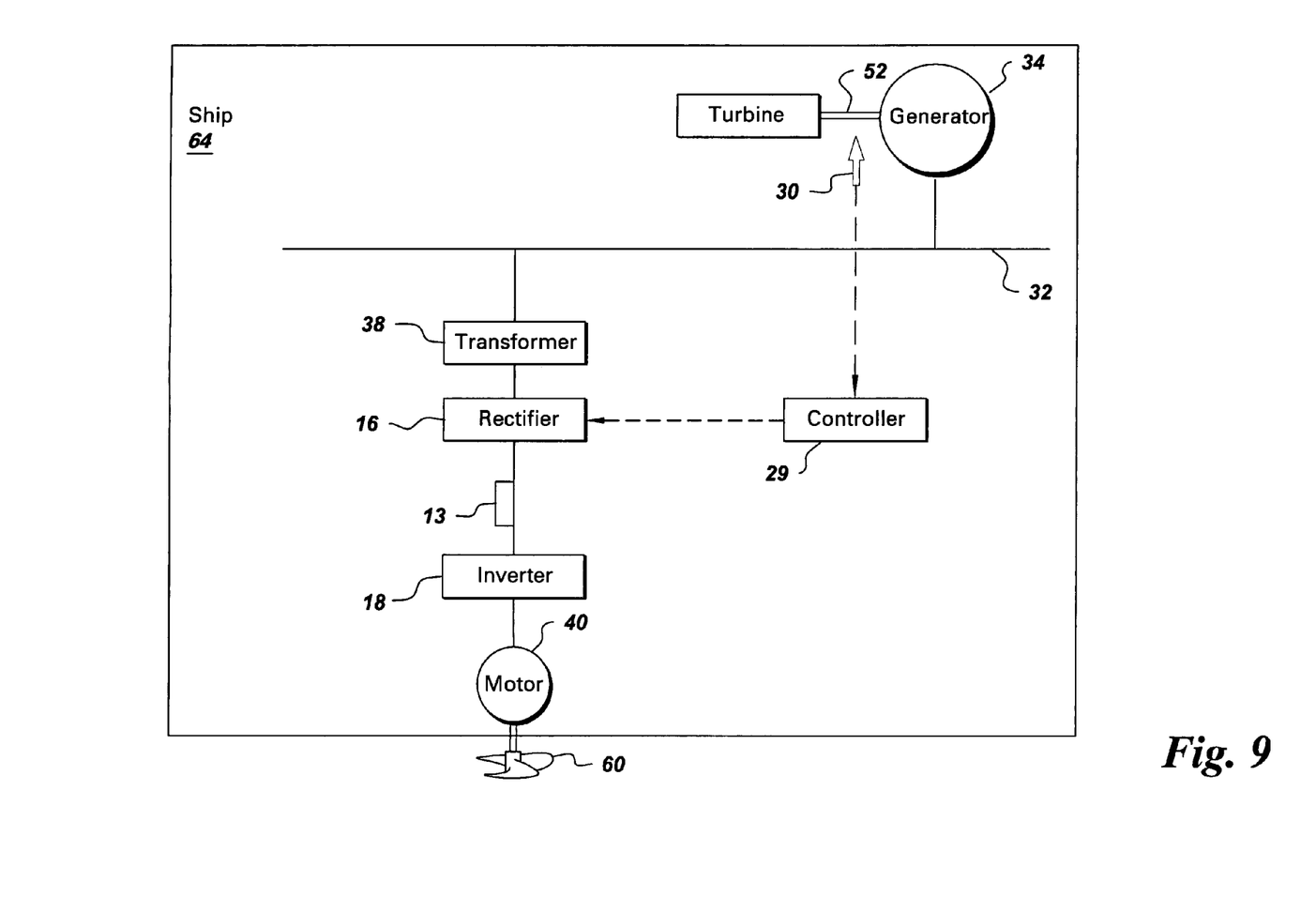
FIG. 9 is a block diagram of a damping system in accordance with another embodiment.

FIG. 9 is a block diagram of a damping system in accordance with an electric ship 64 embodiment wherein motor 40 is coupled to a blade 60. Although the damping system is shown as being applied on the grid side for purposes of example, the damping system can be applied to either one or both of the sides.

The previously described embodiments of the present invention have many advantages, including the provision of integrated torsional vibration damping by focusing on the measured torque and without needing to detect the cause of the vibrations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated torsional mode damping system for modulating current in a DC link of a load commutated inverter system comprising a grid rectifier and a load inverter, the system comprising:
   a sensor configured for sensing a signal representative of torque on a load side shaft; and
   an inverter controller configured for using the sensed signal for detecting a presence of a torsional vibration on the load side shaft and generating inverter control signals for damping the torsional vibration by modulating active power through the load inverter.

2. The system of claim 1 further comprising a rectifier controller configured for generating rectifier control signals for maintaining the grid rectifier at a substantially constant power.

3. The system of claim 1 wherein the inverter controller is configured for detecting the presence of the torsional vibration when the sensed signal is indicative of a natural frequency of the load side shaft.

4. The system of claim 3 wherein the inverter controller is configured for, upon detection of the natural frequency, modulating an inverter delay angle of the load inverter.

5. The system of claim 4 wherein modulating the inverter delay angle comprises modulating in a range of zero degrees through one of an inverter delay angle maximum increase value or an inerter delay angle maximum decrease value.

6. The system of claim 1 wherein the load comprises a motor.

7. The system of claim 6 wherein the load further comprises a compressor directly coupled to the motor or coupled to the motor by a gearbox.

8. The system of claim 7 wherein the sensor is situated such that sensing occurs on a portion of the load side shaft between the motor and the gearbox.

9. The system of claim 7 wherein the sensor is situated such that sensing occurs on a portion of the load side shaft between the gearbox and the compressor.

10. The system of claim 1 wherein the grid rectifier comprises a thyristor rectifier.

11. The system of claim 1 wherein the load inverter comprises a thyristor inverter.

12. An integrated torsional mode damping method for modulating current in a DC link of a load commutated inverter system comprising a grid rectifier and a load inverter, the system comprising:

sensing a signal representative of torque on a load side shaft;

using the sensed signal for detecting a presence of a torsional vibration on the load side shaft;

damping the torsional vibration by modulating active power through the load inverter.

13. The method of claim 12 wherein damping the torsional vibration by modulating the active power through the load inverter occurs while maintaining the grid rectifier at a substantially constant power.

14. The method of claim 13 wherein maintaining the grid rectifier at the substantially constant power comprises sensing DC current and DC voltage on the grid rectifier and controlling the switching of the grid rectifier so as to maintain a constant product of the current and the voltage.

15. The method of claim 12 wherein the presence of the torsional vibration is detected when the sensed signal is indicative of a natural frequency of the load side shaft.

16. The method of claim 15 wherein damping comprises bandpass filtering the sensed signal to detect the presence of the natural frequency.

17. The method of claim 15 further comprising, upon detection of the natural frequency, modulating an inverter delay angle of the load inverter.

18. The method of claim 17 wherein modulating the inverter delay angle comprises modulating in a range of zero degrees through one of an inverter delay angle maximum increase value or an inerter delay angle maximum decrease value.

19. An integrated torsional mode damping system for a current source converter comprising a rectifier, an inverter, and a DC link inductor coupled between the rectifier and the inverter, the method comprising:

a sensor configured for sensing a signal representative of torque on a shaft coupled to the inverter or rectifier; and a controller configured for using the sensed signal for detecting a presence of a torsional vibration on the shaft corresponding to a natural frequency of the shaft and for generating control signals for damping the torsional vibration by modulating active power through the respective inverter or rectifier.

20. The system of claim 19 wherein the controller is configured for, upon detection of the natural frequency, modulating a delay angle of the respective inverter or rectifier.

21. The system of claim 20 wherein modulating the delay angle comprises modulating in a range of zero degrees through one of a delay angle maximum increase value or a delay angle maximum decrease value.

22. The system of claim 19 wherein the grid rectifier comprises a thyristor rectifier and wherein the load inverter comprises a thyristor inverter.

23. An integrated torsional mode damping method for a current source converter comprising a rectifier, an inverter, and a DC link inductor coupled between the rectifier and the inverter, the method comprising:

(a) sensing a signal representative of torque on a shaft coupled to the inverter or rectifier;

(b) using the sensed signal for detecting a presence of a torsional vibration on the shaft corresponding to a natural frequency of the shaft;

(c) damping the torsional vibration by modulating active power through the respective inverter or rectifier.

24. The method of claim 23 wherein damping the torsional vibration by modulating active power occurs while maintaining the other of the inverter or the rectifier at a substantially constant power.

25. The method of claim 24 wherein modulating active power through the respective inverter or rectifier comprises modulating active power through the rectifier and wherein maintaining the inverter at the substantially constant power comprises sensing inverter DC current and DC voltage and controlling the switching of the inverter so as to maintain a constant product of the DC current and the DC voltage.

26. An integrated torsional mode damping system for modulating current in a DC link of a load commutated inverter system comprising a grid rectifier and a load inverter, the system comprising:

a sensor configured for sensing a signal representative of torque on a grid side shaft; and a rectifier controller configured for using the sensed signal for detecting a presence of a torsional vibration on the grid side shaft and generating rectifier control signals for damping the torsional vibration by modulating active power through the grid rectifier.

27. The system of claim 26 further comprising an inverter controller configured for generating inverter control signals for maintaining the load inverter at a substantially constant power.

28. The system of claim 26 wherein the rectifier controller is configured for detecting the presence of the torsional vibration when the sensed signal is indicative of a natural frequency of the grid side shaft.

29. The system of claim 28 wherein the rectifier controller is configured for, upon detection of the natural frequency, modulating a rectifier delay angle of the grid rectifier.

30. The system of claim 29 wherein modulating the rectifier delay angle comprises modulating in a range of zero degrees through one of a rectifier delay angle maximum increase value or a rectifier delay angle maximum decrease value.

31. The system of claim 26 wherein the shaft comprises a generator shaft.

32. The system of claim 31 wherein the load comprises a motor.

33. The system of claim 26 wherein the grid rectifier comprises a thyristor rectifier.

34. An integrated torsional mode damping method for modulating current in a DC link of a load commutated inverter system comprising a grid rectifier and a load inverter, the method comprising:

sensing a signal representative of torque on a grid side shaft;

using the sensed signal for detecting a presence of a torsional vibration on the grid side shaft;

damping the torsional vibration by modulating active power through the grid rectifier.

35. The method of claim 34 wherein damping the torsional vibration by modulating the active power through the grid rectifier occurs while maintaining the load inverter at a substantially constant power.

36. The method of claim 35 wherein maintaining the load inverter at the substantially constant power comprises sensing inverter DC current and DC voltage and controlling the switching of the inverter so as to maintain a constant product of the DC current and the DC voltage.

37. A system comprising:

a load commutated converter comprising a grid rectifier, a load inverter, and a DC link inductor coupled between the rectifier and the inverter;

a sensor configured for sensing a signal representative of torque on a shaft coupled to the inverter or rectifier; and a controller configured for using the sensed signal for detecting a presence of a torsional vibration on the shaft corresponding to a natural frequency of the shaft and for generating control signals for damping the torsional vibration by modulating active power through the respective inverter or rectifier.

38. The system of claim 37 wherein the load commutated inverter is coupled to a motor and is designed for supplying a higher power than needed by the motor.

* * * * *

UNITED STATES PATENT AND TRADEMARK OFFICE
CERTIFICATE OF CORRECTION

PATENT NO.        : 7,173,399 B2  
APPLICATION NO.   : 11/110547  
DATED             : February 6, 2007  
INVENTOR(S)       : Christof Martin Sibler and Joseph Song It is certified that error appears in the above-identified patent and that said Letters Patent is hereby corrected as shown below:

Column 10, Claim 5, Line 4, "inerter" should be --inverter--

Column 10, Claim 12, Line 4, "system" should be --method--

Column 11, Claim 18, Line 4, "inerter" should be --inverter--

Column 11, Claim 19, Line 4, "method" should be --system--

Signed and Sealed this

Twenty-sixth Day of June, 2007

JON W. DUDAS  
*Director of the United States Patent and Trademark Office*